United States Patent [19]

Craig

[11] Patent Number: 4,719,266

[45] Date of Patent: Jan. 12, 1988

[54] VULCANIZATION FORMULATIONS WITH COBALT COMPOUNDS

[75] Inventor: David P. Craig, Ettelbruck, Luxembourg

[73] Assignee: The Goodyear Tire & Rubber Company, Akron, Ohio

[21] Appl. No.: 888,913

[22] Filed: Jul. 22, 1986

Related U.S. Application Data

[63] Continuation of Ser. No. 477,060, Mar. 21, 1983, abandoned.

[51] Int. Cl.$^4$ ............................................. C08C 19/20
[52] U.S. Cl. ................................... 525/346; 428/461; 428/462; 428/465
[58] Field of Search ........................................ 525/346

[56] References Cited

U.S. PATENT DOCUMENTS 3,993,847 11/1976 Kondo ................................. 428/451
4,203,874 5/1980 Halasa ................................. 525/374
4,549,594 10/1985 Ancel .................................. 152/359

FOREIGN PATENT DOCUMENTS 609120 11/1960 Canada .
0031398 7/1981 European Pat. Off. .
993045 5/1965 United Kingdom .
1389800 4/1975 United Kingdom .

Primary Examiner—Christopher Henderson
Attorney, Agent, or Firm—H. C. Young, Jr.

[57] ABSTRACT

The use of metal salts in vulcanizable elastomer compounds is described. In sufficient amounts, the metal salts function as both vulcanization accelerators and adhesion promoters for rubber to metal adhesion, thus eliminating the need for a separate ingredient for each purpose. Certain of the salts also promote the adhesion of the elastomer to metal adherends which have heretofore been unknown, for example, to a zinc surface. Curing characteristics of elastomer formulations using the metal salts are comparable to those using prior art accelerators.

5 Claims, No Drawings

VULCANIZATION FORMULATIONS WITH COBALT COMPOUNDS

This is a continuation of application Ser. No. 477,060, filed Mar. 21, 1983 now abandoned.

TECHNICAL FIELD

The invention lies in the art of rubber compounding and in particular, the field of vulcanization acceleration. The invention comtemplates the use of metal salts which serve as accelerators and which replace conventional prior art accelerators in rubber compounding recipes.

BACKGROUND ART

Organic accelerators have long been used to reduce the cure time of sulfur vulcanized elastomer compounds. Nitrogen-bearing materials in particular can dramatically affect the rate of cure and are utilized today in practically all commerical recipes. Examples of these materials include the various well known thiazoles and sulfenamides, thiocarbamates, thiurams and certain thioureas. It has also been known that certain fatty acids, which are present in the non-hydrocarbon constituents of natural rubber have an influence on the cure rate.

Heretofore, however it has not been known to use metal salts as vulcanization accelerators. While certain metal salts are sometimes added to compounding recipes for other purposes, for example to promote rubber to metal adhesion, the recipes invariably also contain one or more of the conventional accelerators recited above. It has been found feasible and it is the primary aspect of this invention, to eliminate the use of conventional accelerators through substitution of metal salts in compounding recipes.

Prior art usage of metal salts appears in British Pat. Nos. 993,045 and 1,389,800 and European Pat. Application No. 0031398. The British patents utilize conventional prior art accelerators and thus are not pertinent. The European Patent Application contains, in addition to a conventional accelerator, a rosin-derived resin to obtain a result which is nonanalogous to the instant invention. Thus, none of these prior art disclosures recognize that metal salts in sufficient quantities can be used to accelerate sulfur vulcanization.

DISCLOSURE OF THE INVENTION

It is thus an aspect of the invention to provide a novel vulcanization accelerator for sulfur curable elastomer compounds.

Another aspect of the invention is to provide a vulcanization accelerator, as above, which eliminates the need for accelerators of the prior art.

It is yet another aspect of the invention to provide a vulcanization accelerator, as above, which can also function as an adhesion promoter of rubber to metal adhesion.

Still another aspect of the invention is to provide a vulcanization accelerator, as above, which does not detrimentally affect the physical properties of a rubber compound when substituted for conventional accelerators.

It is yet another aspect of the invention to provide a vulcanization accelerator, as above, which reduces the cost of a rubber compound.

It is still another aspect of the invention to provide a vulcanization accelerator, as above, which is a metal salt.

It is yet another aspect of the invention to provide a vulcanization accelerator compound, as above, in which the metal salt is a hydroxide or a salt of a carboxylic acid.

Yet another aspect of the invention is to provide a vulcanization acceleration, as above, which gives cure rates similar to those achieved by the use of conventional accelераters in conventional rubber recipes.

These and other aspects of the invention which will be described in the preferred embodiments hereinbelow are achieved by: an elastomer formulation comprising: the elastomer; a quantity of sulfur; and a metal salt; wherein said metal salt is present in the formulation in an amount of from about 0.5 to about 12 parts per 100 parts by weight of said elastomer; and wherein said metal salt replaces prior art accelerators in said formulation and functions simultaneously as an adhesion promoter for rubber to metal adhesion.

BEST MODE FOR CARRYING OUT THE INVENTION

The metal salts found useful as vulcanization accelerators according to this invention are generally hydroxides and salts of carboxylic acids. Of the former, cobalt hydroxide has been found particularly useful. Suitable carboxylic moieties include naphthenate, octoate, stearate and abietate.

The effectiveness of the above named compounds as accelerators and as adhesion promoters is dependent upon the proper selection of the metal cation. One group of such metals include generally the period 4 transition elements, excluding chromium, manganese and iron. Thus, for example, cobalt, nickel, and copper can be used. In addition, while not a transition element, lead has also been found useful. Examples of preferred metal salts thus include nickel octoate, copper stearate, lead octoate, and cobalt abietate. Highly preferred is cobalt naphthenate, which although used in the prior art as an adhesion promoter, has also been found to provide highly satisfactory vulcanization acceleration when used in adequate amounts.

The metal salts are used in otherwise conventional compounding recipes, replacing the prior art accelerators. If the salt is that of a carboxylic acid, the amount used is generally from about 2 to 12 phr, desirably from about 3 to 8 phr and preferably from about 4 to 7 phr. If the salt is a hydroxide, the amount can be as small as about 0.5 parts and as much as about 12 parts per hundred rubber. In amounts greater than about 12 phr for either type of salt, significant improvements in vulcanization acceleration are not observed and thus these levels are not cost effective. The metal salt may also be formed "in situ" by compounding together a carboxylic acid and a metal hydroxide. For example, a mixture of cobalt hydroxide and abietic acid can produce cobalt abietate in situ.

The examples given below illustrate representative compounding recipes in which the metal salts can be utilized as described herein. It will be noted that while the recipes vary slightly from example to example, control compounds are provided in many cases for comparison purposes. The physical property test results, summarized in the tables and paralleling the examples, serve to illustrate that the metal salts of the invention give consistently good adhesion and acceleration in a variety of rubber compounding recipes. Also the ageing properties when illustrated by rubber adhesion in Table 1 are as good as conventional compounds even though cobalt salts can act as oxidation promoters. In general, it has been found that the details of the compounding recipe, while of course important in tailoring physical properties of the cured compound to a particular application, do not usually in a significant way affect the ability of the salt to accelerate cure.

Example 1 gives various rubber compounding recipes in which a base formulation contains a variable amount of cobalt naphthenate. For comparison purposes, a control recipe was compounded using a sulfenamide accelerator. Physical properties of the cured elastomers are summarized in Table 1. With reference thereto, it can be seen that cobalt naphthenate accelerated compounds exhibited reduced time to 90% cure with increasing levels of the cobalt salt. Torque increase ($\Delta M$), however, remained approximately constant for all levels of the salt. Original wire adhesion, measured shortly after completion of the cure, showed that all the cobalt compounds had high pull-out forced and coverage to both brass-plated and zinc-plated wire. The sulfenamide accelerated compound had high pull-out force values and coverage to brass-plated wire only. The cobalt compound also had significant adhesion to wire in which the brass-plating had been removed, exposing the steel core. Untreated steel likewise showed good adhesion.

Green humidity ageing, that is, adhesion measured, after exposure to humid air prior to cure, produced a decrease in the adhesion level for both the cobalt compounds and the control. The drop in pull out force tended to be greater at the higher metal salts level.

As with green humidity ageing, the cured humidity ageing produced a loss of adhesion in both systems, with a definite trend toward a greater adhesion loss at higher metal salt levels. Comparing the brass-plated wire figures, it can be seen that the stability to humidity ageing of the cobalt salt accelerated compounds was considerably better than the control. The cured oven ageing results also showed a drop in pull out force, but at high coverage for most of the compounds, which is interpreted as being due to a loss in rubber tear strength. As with the previous adhesion results, the cobalt salt compounds gave consistantly superior results compared to the control.

Examples 2, 3, and 4 demonstrate the effectiveness of carboxylic acid salts of nickel, copper, and lead respectively. Formulations having no metal salts are included for comparison. Physical properties of compounds utilizing nickel octoate are summarized in Table 2, in which rheometer data shows that satisfactory cures can be obtained with the nickel salt. As with cobalt, the nickel accelerated compounds showed a high level of adhesion to brass and zinc and some adhesion to steel. Increasing nickel content gave corresponding cure time reductions.

the physical property data from the copper accelerated compound shows that the cure rate is increased relative to the no metal salt control. Increasing levels of the copper salts decreased the adhesion to brass, while adhesion to zinc and steel was improved at the higher levels. Adhesion was increased by cured oven ageing.

The results in Table 4, summarizing the physical properties obtained using lead octoate, show that the rate of vulcanization was similar to the compounds containing the nickel salt. The adhesion to brass was high at all levels of the lead salt, while adhesion to zinc and steel increased for higher levels of the salt. As with the copper salts, cured oven ageing gave an increase in adhesion to zinc and steel.

Example 5 is a compound formulationn utilizing a mixture of abietic acid and cobalt abietate as an accelerator and as an adhesion promoter. Table 5 shows that both cure parameters and wire adhesion are satisfactory. The control compound is similar to that used in Examples 2–4. The abietic acid was added in the form of pine tree gum resin containing minor amounts of inactive components.

Example 6 consists of a series of compound formulations in which cobalt hydroxide was used as an accelerator. In some of the formulations, abietic acid has been added, allowing th formation of an "in situ" metal salt (cobalt abietate). For comparison purposes, both a control compound and a compound using cobalt naphthenate have been included. From the rheometer data of Table 6, it can be seen that the use of cobalt hydroxide gave an increase in the rate of cure over the non-accelerated cure. A further increase in rate was obtained when abietic acid as well as cobalt hydroxide was used in the recipe, indicating the in situ formation of the salt. At equivalent concentration, the cobalt napththenate compound gave a somewhat faster rate of cure and greater change in torque ($\Delta MHR$) than cobalt hydroxide plus abietic acid, although the latter was still within acceptable limits. This example demonstrates that it is possible to form a metal salt during compounding thus eliminating the added cost of providing the salt prior to the compounding stage. Abietic acid, when used to form the in situ salt, is added to the compounding recipe in amounts of from about 3 to about 6 phr, and preferably about 5 phr.

Example 7 compares cobalt naphthenate and sulfenamide accelerated rubber compounds as to rheometer and adhesion properties. Of particular interest is the cobalt adhesion to bare steel wire which is considerably improved over the sulfenamide control.

As stated above, generally the other ingredients in the compounding recipes have little interactive effect with the metal salt. An exception to this is with the use of a nickel salt. It has been found that when nickel salt such as, for example, nickel octoate or nickel naphthenate are used in a rubber compound containing a significant quantity of zinc oxide, adhesion results are poor, at least for original adhesion. Adhesion to brass is unaffected by the presence of zinc oxide in the compound.

The following examples, discussed above, illustrate the invention.

The formulations were compounded according to the following procedures: into a 31 shan intermix were added all of the above compounding ingredients except the sulfur/oil mixture. After 4 minutes mixing time the mix temperature reached 160 degrees C., the batch was then dropped from the mixer. After an interval of 24 hours the batch was further mixed for 2 minutes until the temperature reached 120° C. and the batch was again dropped from the mixer. Again after 24 hours interval the batch was further mixed and when the temperature reached 100° C., the sulfur and sulfamide when present, was added, and mixing continued for another minute. Samples for testing were then taken.

Rheometer and wire adhesion data were carried out under the following conditions: rheometer data was obtained in accordance with the procedures of ASTM D2084. Wire adhesion testing was made using a modified form of ASTM D2229, in which the 2 inch standard block was reduced to 1 inch or 1 centimeter, as indicated.

EXAMPLE 1

The following rubber formulations were prepared utilizing various levels of cobalt naphthanate:

|  | Control |  |  |  |  |  |  |  |  |
|---|---|---|---|---|---|---|---|---|---|
| NATURAL RUBBER | 100 | 100 | 100 | 100 | 100 | 100 | 100 | 100 | 100 |
| CARBON BLACK | 65 | 65 | 65 | 65 | 65 | 65 | 65 | 65 | 65 |
| ZINC OXIDE | 10 | 10 | 10 | 10 | 10 | 10 | 10 | 10 | 10 |
| ANTIOXIDANT | 1 | 1 | 1 | 1 | 1 | 1 | 1 | 1 | 1 |
| STEARIC ACID | 1 | 1 | 1 | 1 | 1 | 1 | 1 | 1 | 1 |
| COBALT NAPHTHENATE | 0 |  |  |  | Variable |  |  |  |  |
| SULFENAMIDE ACCELERATOR | 1.5 | 0 | 0 | 0 | 0 | 0 | 0 | 0 | 0 |
| SULFUR[1] | 8 | 8 | 8 | 8 | 8 | 8 | 8 | 8 | 8 |

[1]80/20 weight ratio sulfur/oil

EXAMPLE 2

Compounds were formulated using nickel octoate as follows:

|  | Control |  |  |  |  |  |
|---|---|---|---|---|---|---|
| NATURAL RUBBER | 100 | 100 | 100 | 100 | 100 | 100 |
| ANTIOXIDANT | 1.5 | 1.5 | 1.5 | 1.5 | 1.5 | 1.5 |
| CARBON BLACK | 65 | 65 | 65 | 65 | 65 | 65 |
| NICKEL OCTOATE | 0 | 3 | 6 | 9 | 12 | 18 |
| SULFUR[1] | 6.5 | 6.5 | 6.5 | 6.5 | 6.5 | 6.5 |

[1]80/20 weight ratio sulfur/oil mix

All of the above formulas were compounded the same manner as in Example 1. Physical property results are summarized in Table 2.

EXAMPLE 3

The same procedure as in Example 2 was followed using copper stearate. Physical property results are summarized in Table 3.

|  | Control |  |  |  |  |  |
|---|---|---|---|---|---|---|
| NATURAL RUBBER | 100 | 100 | 100 | 100 | 100 | 100 |
| ANTIOXIDANT | 1.5 | 1.5 | 1.5 | 1.5 | 1.5 | 1.5 |
| CARBON BLACK | 65 | 65 | 65 | 65 | 65 | 65 |
| COPPER STEARATE | 0 | 3 | 6 | 9 | 12 | 18 |
| SULFUR[1] | 6.5 | 6.5 | 6.5 | 6.5 | 6.5 | 6.5 |

[1]80/20 weight ratio sulfur/oil

EXAMPLE 4

The procedure of Example 2 was followed using lead octoate. Results are summarized in Table 4.

|  | Control |  |  |  |  |  |
|---|---|---|---|---|---|---|
| NATURAL RUBBER | 100 | 100 | 100 | 100 | 100 | 100 |
| ANTIOXIDANT | 1.5 | 1.5 | 1.5 | 1.5 | 1.5 | 1.5 |
| CARBON BLACK | 65 | 65 | 65 | 65 | 65 | 65 |
| LEAD OCTOATE | 0 | 3 | 6 | 9 | 12 | 18 |
| SULFUR[1] | 6.5 | 6.5 | 6.5 | 6.5 | 6.5 | 6.5 |

[1]80/20 weight ratio sulfur/oil

EXAMPLE 5

A rubber formulation was compounded according to the procedure used in Example 1 having the following recipe:

| FORMULATION |  |
|---|---|
| NATURAL RUBBER | 100 |
| ANTIOXIDANT | 1.5 |
| CARBON BLACK | 65 |
| ZINC OXIDE | 10 |
| ABIETIC ACID + COBALT ABIETATE[1] | 12 |
| SULFUR[2] | 6.5 |

[1]in the form of pine tree gum resin
[2]80/20 weight ratio sulfur/oil mix

Physical properties were measured according to the procedure in Example 1 and are summarized in Table 5.

EXAMPLE 6

The following formulations were made and compounded according to the procedure outlined in Example 1:

|  | Control |  |  |  |  |
|---|---|---|---|---|---|
| NATURAL RUBBER | 100 | 100 | 100 | 100 | 100 |
| CARBON BLACK | 65 | 65 | 65 | 65 | 65 |
| ANTIOXIDANT | .5 | .5 | .5 | .5 | .5 |
| COBALT HYDROXIDE | 0 | 1 | 1 | 0 | 0 |
| ABIETIC ACID[1] | 0 | 0 | 5 | 0 | 5 |
| COBALT NAPHTHANATE | 0 | 0 | 0 | 6 | 6 |
| SULFUR[2] | 6.5 | 6.5 | 6.5 | 6.5 | 6.5 |

[1]In the form of pine tree gum resin
[2]80/20 weight ratio sulfur/oil mix

Physical properties were measured according to the procedure of Example 1 and are summarized in Table 6.

EXAMPLE 7

The following formulations were made and compounded according to the procedure outlined in Example 1:

| FORMULATIONS |  |  |
|---|---|---|
| NATURAL RUBBER | 100 | 100 |
| CARBON BLACK | 65 | 65 |
| ZINC OXIDE | 10 | 10 |
| ANTIOXIDANT | 1 | 1 |
| STEARIC ACID | 1 | 1 |
| COBALT NAPHTHENATE | 6 | 0 |
| SULFUR[1] | 8 | 8 |
| SULFENAMIDE ACCELERATOR | 0 | .7 |

[1]80/20 weight ratio sulfur/oil mix

Physical properties were measured according to the procedure of Example 1 and are summarized in Table 7.

All of the above examples utilize natural rubber as the vulcanizate. It will be appreciated, however, that the metal salts of the invention can be utilized in a variety of other elastomer formulations. The following are examples: the various copolymers of styrene and butadiene, butyl rubber, that is, a copolymer of isobutylene and isoprene, polybutadiene, synthetic polyisoprene, the various chlorinated rubbers (neoprene) and the like. In general, the invention comtemplates the use of any elastomer which is capable of being sulfur cured. Thus, are included various blends of the above and the copolymers. Other elastomers not specifically recited may also be used such as those mentioned in *The Vanderbilt Rubber Handbook*, Winspear, Geo. (Ed.), R. T. Vanderbilt Company, Inc., New York, N.Y., 1968, which is hereby incorporated by reference with regard to the types of sulfur curable elastomers mentioned therein. Besides the various polymers, other rubber compounding ingredients, well known in the art, may be utilized. These include for example the various antioxidants, antiozonants, carbon black, processing aids, organic modifiers, mineral fillers, and the like. Specific examples of these rubber compounding constituents are also contained in *The Vanderbilt Rubber Handbook*.

While in accordance with the patent statutes only the best mode and preferred embodiments have been disclosed herein, it is to be understood that the invention is not limited thereto or thereby. Therefore, for a fuller understanding of the true scope of the invention, reference should be made to the following attached claims.

TABLE 2

| | Nickel Octoate Level | | | | | |
|---|---|---|---|---|---|---|
| | Control 0 | 3 | 6 | 9 | 12 | 18 |
| Monsanto Rheometers, 1° Arc, 1.67 Hz, Microdies 149° C. | | | | | | |
| $M_L$ N.m | 1.43 | 1.26 | 1.15 | 1.12 | 1.05 | .91 |
| $M_{HR}$ N.m | | 4.39 | 4.21 | 4.10 | 4.56 | 5.02 |
| $\Delta M$ N.m | | 3.13 | 3.06 | 2.98 | 3.51 | 4.11 |
| $t_s$ 0.2 min | 10.6 | 3.4 | 3.3 | 3.6 | 3.4 | 3.8 |
| $t_s$ 0.5 min | 24.8 | 5.1 | 4.8 | 5.1 | 4.9 | 5.3 |
| $t_s$ 1.0 min | 46.7 | 7.2 | 7.3 | 7.4 | 7.2 | 7.6 |
| $tM_{HR}$ min | | | | 18.8 | 20.0 | 24.0 |
| Steel Wire Adhesion, SBAT, 7 × 4 × .20 + 1 Wires, Pull-Out Force KN, Coverage (0–10), Cure (25.10) min at 149° C. | | | | | | |
| Original | | | | | | |
| Brass plated | 1.45(9) | .93(10) | 1.32(9) | 1.08(10) | .80(9) | |
| Brass removed | .43(1) | .46(1) | .44(1) | .58(2) | .26(0) | |
| Zinc plated | 1.42(8) | 1.45(9) | 1.02(9) | 1.35(10) | .91(10) | |
| Green Humidity Aged, 10 Days Room Temperature, High Humidity | | | | | | |
| Brass plated | .66(6) | .60(6) | .54(5) | .46(3) | .22(1) | |
| Brass removed | .82(8) | .74(8) | .75(8) | .74(9) | .36(2) | |
| Zinc plated | .60(6) | .51(4) | .45(4) | .42(3) | .24(1) | |
| Cured Humidity Aged, 15 Days 77° C., High Humidity | | | | | | |
| Brass plated | .75(8) | .65(3) | .31(2) | .24(1) | .23(0) | |
| Brass removed | .43(2) | .53(4) | .69(4) | .45(4) | .13(0) | |
| Zinc plated | .67(6) | .69(4) | .54(2) | .31(1) | .16(0) | |
| Cured Oven Aged, 20 Days 90° C., Air | | | | | | |
| Brass plated | .97(8) | 1.10(8) | 1.10(9) | 1.16(9) | .86(3) | |
| Brass removed | .64(6) | .84(7) | .84(7) | .84(7) | .32(0) | |
| Zinc plated | .89(6) | 1.16(8) | 1.24(7) | 1.18(9) | 1.17(7) | |

TABLE 1

| | Cobalt Naphthenate level (phr) | | | | | | | | |
|---|---|---|---|---|---|---|---|---|---|
| | Control 0 | 4 | 6 | 6 | 8 | 10 | 12 | 16 | 20 |
| Monsanto Rheometer 149° C. ± 1° Arc, 1.67 Hz, Microdie, with Mylar ASTM D 2084 | | | | | | | | | |
| $M_L$ N.m | 1.37 | 1.17 | .98 | 1.12 | 1.02 | .95 | .87 | .79 | .65 |
| $M_{HR}$ N.m | 7.47 | 5.42 | 5.42 | 5.32 | 5.52 | 5.66 | 5.70 | 5.60 | 5.39 |
| $\Delta M$ N.m | 6.10 | 4.25 | 4.44 | 4.20 | 4.00 | 4.71 | 4.83 | 4.81 | 4.74 |
| $t_s$ 0.2 min | 4.2 | 3.9 | 4.1 | 4.0 | 4.1 | 4.2 | 4.2 | 4.4 | 4.2 |
| $t_s$ 0.5 min | 5.1 | 5.3 | 5.3 | 5.3 | 5.2 | 5.2 | 5.2 | 5.3 | 5.1 |
| $t_s$ 1.0 min | 6.1 | 6.8 | 6.7 | 6.8 | 6.5 | 6.5 | 6.4 | 6.5 | 6.3 |
| $t'_c(90)$, min | 21.3 | 32 | 21 | 19.7 | 15.7 | 14.8 | 14.2 | 14.0 | 13.1 |
| $tM_{max}$ tS max min | 55 | 70 | 50 | 50 | 33 | 26 | 21 | 20 | 17.5 |
| Assigned cure min | 40 | 40 | 40 | 40 | 20 | 20 | 20 | 20 | 15 |
| Steel Wire Adhesion (ASTM D2229)[1] Median of 4 Pull-Out Force, KN; Broken Wires (if any); Coverage | | | | | | | | | |
| Original | | | | | | | | | |
| Brass-plated | .41–1(9) | .38–2(9) | .39(8) | .44–3(9) | .41–1(9) | .45–3(9) | .34(8) | .37(8) | .37(9) |
| Brass removed | .08(0) | .22(3) | .22(3) | .21(3) | .13(1) | .23(3) | .13(1) | .14(1) | .21(3) |
| Zinc plated | .04(0) | .43(8) | .40–1(9) | .41(9) | .38(8) | .45(9) | .38(9) | .41(8) | .39(9) |
| Green Humidity Aged 10 days 38° C. Saturated Air | | | | | | | | | |
| Brass-plated | .18(5) | .18(5) | .13(5) | .16(5) | .12(4) | .15(5) | .11(2) | .14(4) | .18(4) |
| Brass removed | .04(0) | .11(1) | .18(4) | .16(3) | .17(3) | .17(4) | .13(2) | .11(2) | .18(4) |
| Zinc plated | .03(0) | .15(3) | .22(5) | .17(5) | .19(4) | .13(3) | .10(2) | .09(2) | .12(3) |
| Cured Humidity Aged 3 Days 77° C. High Humidity | | | | | | | | | |
| Brass-plated | .29(6) | .41(8) | .37(8) | .32(7) | .40(8) | .40(8) | .28(6) | .30(6) | .34(8) |
| Brass removed | .07(0) | .18(1) | .17(3) | .10(1) | .17(2) | .17(2) | .10(0) | .10(0) | .14(1) |
| Zinc plated | .04(0) | .34(7) | .37(8) | .30(5) | .34(8) | .34(8) | .27(4) | .23(4) | .34(5) |
| Cured Humidity Aged 6 Days 77° C. High Humidity | | | | | | | | | |
| Brass-plated | .22(4) | .42(7) | .30(8) | .43–1(8) | .32(7) | .38(7) | .26(5) | .27(6) | .30(7) |
| Brass removed | .07(0) | .14(1) | .17(2) | .14(1) | .10(0) | .14(1) | .09(0) | .09(0) | .11(1) |
| Zinc plated | .04(0) | .32(6) | .37(7) | .32(6) | .26(3) | .32(7) | .19(3) | .15(2) | .23(5) |
| Cured Oven Aged 7 Days 90° C. Air | | | | | | | | | |
| Brass-plated | .33(9) | .39(9) | .29(9) | .42(9) | .39(9) | .35(9) | .32(9) | .36(8) | .37(9) |
| Brass removed | .10(0) | .22(2) | .19(3) | .21(2) | .14(1) | .19(2) | .15(1) | .14(1) | .20(2) |
| Zinc plated | .05(0) | .43(9) | .39(9) | .40(9) | .36(9) | .37(9) | .34(9) | .36(8) | .39(8) |

[1]modified as described in specification and hereinafter referred to as "SBAT"

TABLE 3

Copper stearate level

| | Control 0 | 3 | 6 | 9 | 12 | 18 |
|---|---|---|---|---|---|---|
| Monsanto Rheometers, 1° Arc, 1.67 Hz, Microdies (ASTM D2084) 149° C. | | | | | | |
| $M_L$ Smin | 1.74 | 1.28 | 1.21 | 1.15 | 1.16 | .96 |
| $M_{HR}$ Smax | | | | 3.61 | 3.55 | 3.19 |
| ΔM | | | | 2.46 | 2.39 | 2.23 |
| $t_S$ 0.2 | 14 | 2.2 | 2.4 | 2.0 | 1.9 | 2.2 |
| $t_S$ 0.5 | 26 | 3.8 | 3.9 | 3.4 | 3.1 | 3.4 |
| $t_S$ 1.0 | 48 | 23 | 12 | 6.7 | 6.2 | 5.7 |
| $M_{HR}$ | | | | 120 | 120 | 120 |

Steel Wire Adhesion, SBAT, 7 × 4 × .20 + 1 Wires, Pull Out Force KN. Coverage (0–10), Cure (20 + 10), min at 149° C.

Original
| Brass plated | 1.11(9) | .77(6) | .60(5) | .55(5) | .43(5) |
|---|---|---|---|---|---|
| Brass removed | .26(0) | .27(0) | .24(0) | .23(0) | .22(0) |
| Zinc plated | .30(0) | .32(0) | .34(0) | .39(1) | .38(1) |

Green Humidity Aged, 10 Days Room Temperature, High Humidity
| Brass plated | .46(5) | .43(5) | .40(4) | .38(4) | .40(4) |
|---|---|---|---|---|---|
| Brass removed | .24(0) | .24(0) | .22(0) | .20(0) | .19(0) |
| Zinc plated | .24(0) | .24(0) | .26(0) | .28(1) | .40(2) |

Cured Humidity Aged, 15 Days 77° C., High Humidity
| Brass plated | .59(5) | .39(3) | .30(2) | .35(1) | .43(2) |
|---|---|---|---|---|---|
| Brass removed | .22(0) | .24(0) | .26(0) | .28(0) | .33(2) |
| Zinc plated | .31(1) | .29(1) | .39(2) | .45(2) | .55(3) |

Cured Oven Aged, 20 Days 90° C. Air
| Brass plated | .95(8) | .74(7) | .74(5) | .73(3) | .64(4) |
|---|---|---|---|---|---|
| Brass removed | .32(0) | .43(1) | .46(1) | .53(1) | .44(1) |
| Zinc plated | .53(1) | .50(1) | .66(2) | .87(8) | .80(5) |

TABLE 4

Lead octoate level

| | Control 0 | 3 | 6 | 9 | 12 | 18 |
|---|---|---|---|---|---|---|
| Monsanto Rheometers, 1° Arc, 1.67 Hz, Microdies 149° C. | | | | | | |
| $M_L$ | 1.44 | 1.50 | 1.39 | 1.37 | 1.32 | 1.16 |
| $M_{HR}$ | | | | 4.29 | 4.12 | 4.09 | 4.65 |
| $t_S$ 0.2 | 13.0 | 2.4 | 2.2 | 1.8 | 1.8 | 1.9 |
| $t_S$ 0.5 | 27.5 | 3.7 | 3.2 | 2.8 | 3.0 | 3.6 |
| $t_S$ 1.0 | 52.5 | 8.1 | 5.7 | 5.1 | 5.4 | 6.8 |
| $tM_{HR}$ | | 24C | 150 | 120 | 26 | |

Wire Adhesion, SBAT, 7 × 4 × .20 + 1 Wires, Pull Out Force KN, Coverage (0–10), Cure (25 + 10) min at 149° C.

Original
| Brass plated | 1.26(10) | 1.36(10) | 1.00(9) | 1.24(8) | .84(8) |
|---|---|---|---|---|---|
| Brass removed | .41(0) | .46(1) | .41(1) | .38(1) | .37(1) |
| Zinc plated | .41(0) | .41(0) | .47(1) | .52(2) | .56(2) |

Green Humidity Aged, 10 Days, Room Temperature, High Humidity
| Brass plated | 1.11(9) | .68(7) | .72(5) | .73(6) | .72(5) |
|---|---|---|---|---|---|
| Brass removed | .46(3) | .46(2) | .47(2) | .50(2) | .38(2) |
| Zinc plated | .32(0) | .36(0) | .40(1) | .44(1) | .46(2) |

Cured Humidity Aged, 15 Days 77° C., High Humidity
| Brass plated | .77(7) | .81(7) | .63(6) | .65(4) | .29(1) |
|---|---|---|---|---|---|
| Brass removed | .27(1) | .31(1) | .34(1) | .36(1) | .36(1) |
| Zinc plated | .30(0) | .28(1) | .30(0) | .35(1) | .26(1) |

Cured Oven Aged, 20 Days 90° C. Air
| Brass plated | .96(8) | .68(7) | .84(7) | .75(7) | .75(5) |
|---|---|---|---|---|---|
| Brass removed | .81(7) | .47(5) | .69(5) | .75(7) | .61(6) |
| Zinc plated | .59(5) | .58(5) | .72(6) | .75(7) | .82(6) |

TABLE 5

| Monsanto Rheometer, 149° C. | |
|---|---|
| $M_L$ N.m | 1.18 |
| $M_{HR}$ N.m | 4.30 |
| M N.m | 3.12 |
| $t_S$ 0.2 min | 5.3 |
| $tM_{HR}$ min | 60 |

Assigned cure 30 min. at 149° C.

TABLE 5-continued

| Tensiles | |
|---|---|
| 300% Modulus, MPa | 9.7 |
| Tensile Strength, MPa | 18.8 |
| % Elongation at break | 510 |
| Shore Hardness | 78 |

1 cm Block SBAT Wire Adhesion (4 Pulls, median pull-out force KN, coverage 0–10)

Original
| Brass plated steel | 4 × .25 | .44 (all wires broke) |
|---|---|---|
| Unplated steel | 4 × .25 | .26(1) |
| Zinc plated steel | 4 × .25 | .44(7) |

Cured Humidity Aged, 6 Days, 77° C., water saturated air
| Brass plated steel | 4 × .25 | .45(7) (3 wires broke) |
|---|---|---|
| Unplated steel | 4 × .25 | .27(1) (1 wire broke) |
| Zinc plated steel | 4 × .25 | .40(60) |

TABLE 6°

| | | | | |
|---|---|---|---|---|
| Cobalt Hydroxide | 1 | 1 | | |
| Abietic Acid | | 5 | | 5 |
| Cobalt Naphthenate | | | 6 | 6 |

Monsanto Rheometer, 149° C., ± 1° Arc, 1.67 Hz, microdie, with Mylar

| | | | | |
|---|---|---|---|---|
| $M_L$ Smin N.m[1] | 1.51 | 1.44 | 1.21 | 1.18 | 1.00 |
| $M_{HR}$ Smax N.m | | 4.37 | 3.97 | 4.29 | 3.50 |
| ΔSmax N.m | | 2.93 | 2.76 | 3.11 | 2.50 |
| $t_S$ 0.2 min | 14.5 | 4.4 | 5.5 | 4.2 | 5.0 |
| $t_S$ 0.5 min | 28 | 6.3 | 7.0 | 5.3 | 6.2 |
| $t_S$ 1.0 min | 49 | 11.3 | 9.4 | 6.7 | 8.1 |
| $tM_{HR}$ tSmax min | 120 | 70 | 65 | 65 | |

Wire Adhesion, SBAT, Pulled Cold 5 cms/min, cure (40 + 10) min at 149° C. 7 × 4 × .22 + 1, Pull-Out Force KN, coverage 0 to 10

Original
| Brass plated | 1.40(9) | 1.57(9) | 1.55(9) | 1.42(9) |
|---|---|---|---|---|
| Brass removed | .54(2) | .64(3) | .64(3) | .52(2) |
| Zinc plated | .76(2) | 1.56(8) | 1.59(8) | 1.43(7) |

Green Humidity Aged, 10 Days High Humidity Room Temperature
| Brass plated | 1.42(10) | 1.32(10) | 1.54(10) | .66(7) |
|---|---|---|---|---|
| Brass removed | .46(1) | .53(1) | .54(1) | .69(1) |
| Zinc plated | .50(2) | 1.32(9) | .96(8) | .71(4) |

Cured Humidity Aged, 15 Days 77° C. High Humidity
| Brass plated | .76(7) | .77(8) | .68(5) | .73(6) |
|---|---|---|---|---|
| Brass removed | .45(2) | .37(2) | .39(2) | .45(1) |
| Zinc plated | .49(1) | .59(3) | .39(3) | .61(5) |

Cured Oven Aged, 20 Days 90° C. Air
| Brass plated | .80(8) | .84(8) | .82(8) | .94(9) |
|---|---|---|---|---|
| Brass removed | .81(8) | .67(7) | .66(6) | .74(6) |
| Zinc plated | .69(4) | .73(7) | .75(6) | .91(7) |

[1] Torque values converted to SI unit from in. lbs.

TABLE 7

| | Cobalt Naphthenate Accelerated | Sulfenamide Accelerated |
|---|---|---|
| Monsanto Rheometer 149° C. | | |
| $M_L$ N.m | 1.15 | 1.56 |
| $M_{HR}$ N.m | 5.32 | 6.71 |
| M N.m | 4.17 | 5.15 |
| $t_S$ 0.2 min | 4.2 | 4.7 |
| $t'_c$ (90) min | 22.0 | 37.0 |
| $tM_{HR}$ tSmax min | 50 | 75 |
| Assigned Cure | 25 min, 149° C. | 40 min, 149° C. |

SBAT Wire Adhesion (4 Wires: median Pull-out force KN and coverage rated 0–10)

Original
| | | |
|---|---|---|
| 1" block steel (unplated)[1] | .52(3) | .18(0) |
| 1" cm block stainless steel (unplated)[2] | .29(4) | .03(0) |

[1] 7 × 3 × .15
[2] 4 × .25

What is claimed is:

1. An elastomer formulation, consisting essentially of: a sulfur curable elastomer selected from the group consisting of natural rubber, copolymers of styrene and butadiene, polybutadiene, synthetic polyisoprene, and chlorinated rubbers;

a quantity of sulfur;

conventional compounding ingredients other than accelerators; and at least one cobalt salt accelerator consisting essentially of a salt selected from the group consisting of cobalt octoate, cobalt naphthenate, cobalt sterate, cobalt abietate and cobalt hydroxide, said at least one cobalt salt accelerator being present in the formulation in an amount of from about 2 to about 12 parts per 100 parts by weight of said elastomer, said at least one cobalt salt accelerator being the sole accelerator present;

said formulation being curable and adherent to the surface of a metal selected from the group consisting of steel and zinc.

2. An elastomer formulation according to claim 1, wherein said at least one cobalt salt accelerator is selected from the group consisting of cobalt abietate, cobalt naphthenate, and cobalt hydroxide.

3. An elastomer formulation according to claim 1 wherein said elastomer is natural rubber.

4. A formulation according to claim 1, wherein said metal comprises a plurality of wires embedded in said formulation; and wherein the vulcanized formulation is used in the manufacture of a reinforced rubber article.

5. A formulation according to claim 1, wherein at least one cobalt salt accelerator is cobalt naphthenate present in said formulation in an amount of from about 4 to about 7 parts per hundred parts elastomer.

* * * * *